Jan. 14, 1930.                F. DEMAN                 1,743,120
                               COMPACT
                          Filed Aug. 16, 1928
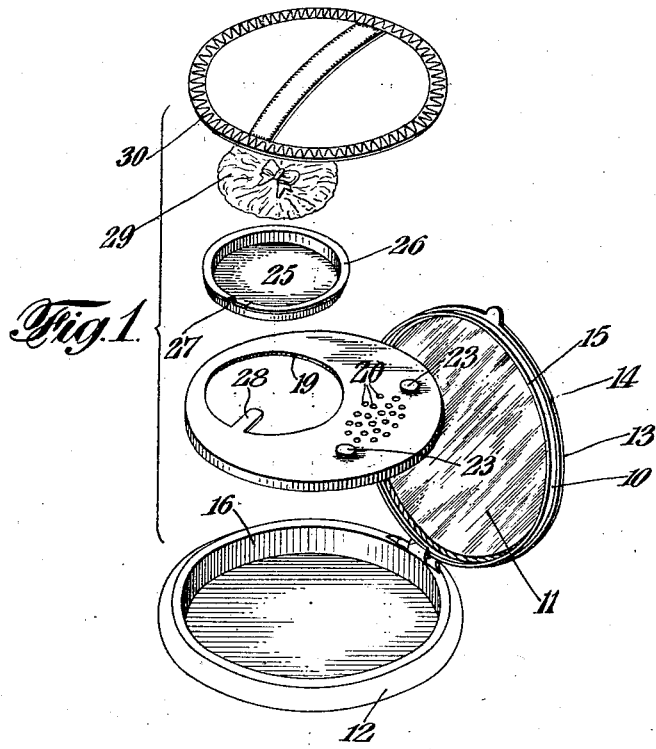
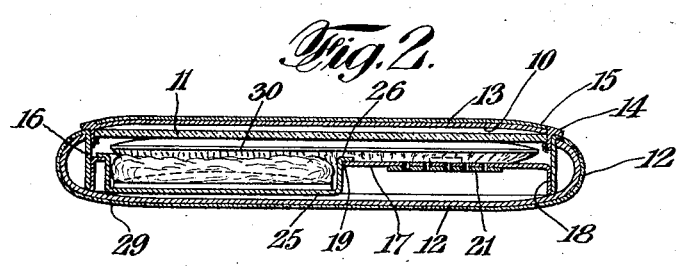
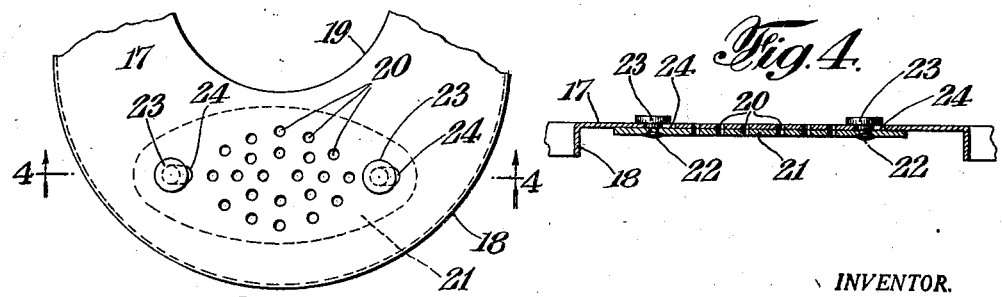
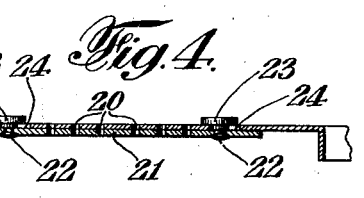
INVENTOR.
Felix Deman
BY Ward + Crosby
ATTORNEYS.

Patented Jan. 14, 1930

1,743,120

UNITED STATES PATENT OFFICE

FELIX DEMAN, OF NEW YORK, N. Y.

COMPACT

Application filed August 16, 1928. Serial No. 299,911.

This invention relates to compacts and has particular reference to a new and improved compact in which the powder and rouge are disposed within the same casing.

The objects of the invention include, among others, the provision of a thin well proportioned structure, convenient to use, and including space for a relatively large mirror.

A further object is to provide a compact in which the parts are readily separable and removable for cleaning or replacement, etc.

Further and more specific objects, features and advantages will more clearly appear from the detailed description given below taken in connection with the accompanying drawings which form part of the specification, and which illustrate one embodiment of the invention.

In the drawings, which are illustrative of a preferred form of the invention,

Fig. 1 is a perspective view of the casing, showing the parts removed therefrom but in proper spaced relation to each other to indicate how they are related when disposed therewithin, Fig. 2 is a vertical diametrical section taken through the casing with the parts in position, Fig. 3 is a partial plan view of the sifter plate, and Fig. 4 is a section taken on the line 4—4 of Fig. 3.

The invention, as embodied in the particular example, herein described, briefly and in general terms, comprises an artistically ornamented thin compact casing having a hinged cover on the inner face of which a full mirror is disposed. Removably supported above the bottom of the casing is a powder sifting plate having perforations and a filling opening. A rouge cup is removably disposed in the filling opening with its upper edge substantially flush with the upper face of the sifter plate. Means on the plate is provided to hold the cup in position. This construction and arrangement facilitates separation of the casing, the sifter plate, and the cup, and yet enables these parts to be nested together so that an exceptionally thin compact results.

As illustrated, a preferred example of the invention comprises a round flat casing having a similarly shaped hinged cover 10. On the inner face of the cover 10 is disposed a large mirror 11 extending over substantially the full area of the cover. The casing and the cover may be made of stamped sheet material, the casing being covered with an artistically ornamented layer 12 of enamel or other suitable decorative material, the cover being likewise provided with a similar layer 13.

The cover may have an outwardly extending flange 14 which overlaps the adjacent face of the casing, and a downwardly extending flange 15 which lies snugly within the inner vertical wall 16 of the casing and may be formed by turning down the inner edge of the sheet of material of which the casing is composed. A sifter plate 17 may be disposed within the casing and supported above the bottom thereof by means of a peripheral flange 18 which lies snugly against the wall 16. This plate 17 may have a filling opening 19 and a series of perforations 20 through which the powder sifts and these perforations may normally be in alignment with similar perforations in a plate 21 lying beneath the plate 17 and slidable with respect thereto. The slidable plate 21 may be provided with studs 22 having heads 23 and passing through slots 24 in the sifter plate 17. The plate 21 may therefore be moved laterally to dis-align the perforations and prevent the powder from sifting through.

Normally disposed in the filling opening is a rouge cup 25 having an outwardly extending flange 26 along its upper edge. This cup 25 is adapted to lie in the opening 19 with the flange resting on the upper surface of the sifter plate 17. The plate and the cup may have their upper surfaces therefore substantially flush with each other. The rouge cup 25 may be formed with a slot 27 in its side wall. A tongue 28 on the sifter plate 17 may project inwardly from the edge of the filling opening 19 and through the slot 27. A rouge pad 29 may be kept in the cup and held in position together with the rouge, by means of the tongue 28. A powder puff as at 30 may be kept on top of this assembly and beneath the cover 10.

With the parts assembled as shown in Fig. 2 the powder will be contained beneath the sifter plate 17 and will sift through the perforations 20 when the slidable plate 21 is in position to align the perforations. When the cover 10 is lifted either the powder pad 30 or the rouge pad 29 may readily be used. The fact that the rouge cup 25 is nested substantially wholly within the sifter plate 17 permits the construction to be made as a very thin unit.

To replenish the powder within the casing or to separate the parts so that they can be cleaned or replaced, etc., the pads 29 and 30 are first removed. Then the rouge cup 25 is lifted out of the filling opening 19, whereupon the fresh powder may be inserted through this opening or if desired the whole sifter plate 17 may be lifted out of the casing. The interengagement of the slot 27 and the tongue 28 causes the rouge cup and the rouge pad to be firmly held in place. The whole sifter unit with the rouge cup may be lifted out as a unit by merely grasping the tongue and lifting on the same, which will cause the inner parts to be removed together.

It is not desired to limit the invention to the details or specific examples herein described, since it will be apparent to those skilled in the art, after understanding the invention, that it is susceptible to various other adaptations and modifications, such as may be made without departing from the scope of the invention, and I aim therefore in the appended claims to cover all such adaptations and modifications.

What I claim as new and desire to secure by Letters Patent of the United States is:

1. In a powder and rouge compact, a casing, a sifter plate disposed therein, a peripheral flange on said plate extending downwardly to act as a supporting member for said plate, said sifter plate having a filling opening, a rouge cup disposed in said opening, a flange on said cup resting on the adjacent surface of said sifter plate with the upper edge of the cup substantially flush with the upper surface of the sifter plate, said cup having a slot in its side wall, and a tongue formed on said sifter plate and extending from the edge of the filling opening through said slot and over the cup to hold said cup and its contents in position.

2. A sifter plate unit for powder and rouge compacts comprising a plate with a dependent peripheral flange and a filling opening, a rouge cup disposed in said opening, a flange on said cup resting on the adjacent surface of the sifter plate with the upper edge of the cup substantially flush with the upper surface of the plate, and means on the plate extending over the cup to hold said cup in position.

3. In a powder and rouge compact, a casing, a sifter plate disposed therein, said sifter plate having a filling opening, a rouge cup disposed in said opening, a flange on said cup resting on the adjacent surface of said sifter plate with the upper edge of the cup substantially flush with the upper surface of the sifter plate, said cup having a slot in its side wall, and a tongue formed on said sifter plate and extending from the edge of the filling opening through said slot and over the cup to hold said cup and its contents in position.

4. In a powder and rouge compact, a casing, a sifter plate disposed therein of generally circular configuration, said sifter plate having a filling opening, a rouge cup disposed in said opening, means integrally formed on said sifter plate for removably retaining said cup in said opening, said opening being at a position eccentric in respect to the sifter plate, a perforated sifter area being provided in the sifter plate at a position opposite said opening, and closure means for said perforations mounted beneath the sifter plate, but operable from the top thereof.

5. A sifter plate unit for a powder and rouge compact, comprising a sifter plate having a filling opening, a rouge cup disposed in said opening, a flange on said cup resting on the adjacent surface of the sifter plate, and means on the plate extending over the cup and for a substantial distance inwardly of the edge thereof to removably retain said cup and a rouge puff therein in position.

In testimony whereof I have signed my name.

FELIX DEMAN.